(12) United States Patent
Fritz et al.

(10) Patent No.: US 11,167,308 B2
(45) Date of Patent: Nov. 9, 2021

(54) PRINT HEAD FOR THE APPLICATION OF A COATING AGENT ON A COMPONENT

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 16/468,697

(22) PCT Filed: Dec. 1, 2017

(86) PCT No.: PCT/EP2017/081101
§ 371 (c)(1),
(2) Date: Jun. 12, 2019

(87) PCT Pub. No.: WO2018/108564
PCT Pub. Date: Jun. 21, 2018

(65) Prior Publication Data
US 2019/0337005 A1 Nov. 7, 2019

(30) Foreign Application Priority Data

Dec. 14, 2016 (DE) ..................... 10 2016 014 946.9

(51) Int. Cl.
*B05C 11/10* (2006.01)
*B05C 5/02* (2006.01)
(Continued)

(52) U.S. Cl.
CPC .......... *B05C 11/1034* (2013.01); *B05C 5/022* (2013.01); *B05C 5/0237* (2013.01);
(Continued)

(58) Field of Classification Search
CPC . B05C 11/1034; B05C 5/0237; B05C 5/0275; B05C 5/022; B05C 11/1028;
(Continued)

(56) References Cited

U.S. PATENT DOCUMENTS 3,421,694 A 1/1969 Muller
3,717,306 A 2/1973 Hushon et al.
(Continued)

FOREIGN PATENT DOCUMENTS

CN 2287527 Y 8/1998
CN 1331661 A 1/2002
(Continued)

OTHER PUBLICATIONS

European Search Report for EP20170638.9 dated Sep. 14, 2020 (4 pages—English translation not available).
(Continued)

*Primary Examiner* — Laura Edwards
(74) *Attorney, Agent, or Firm* — Bejin Bieneman PLC

(57) ABSTRACT

The disclosure concerns a printhead for applying a coating agent to a component, in particular for applying a paint to a motor vehicle body component, having at least one outlet opening for dispensing the coating agent, a coating agent supply for supplying the coating agent to the outlet opening, a movable valve element, the valve element in the closed position closes the outlet opening, whereas the valve element in the open position opens the outlet opening, and with a valve actuator for moving the valve element between the opening position and the closed position. The disclosure additionally provides for a flexible membrane which sepa-
(Continued)

Figure 1:
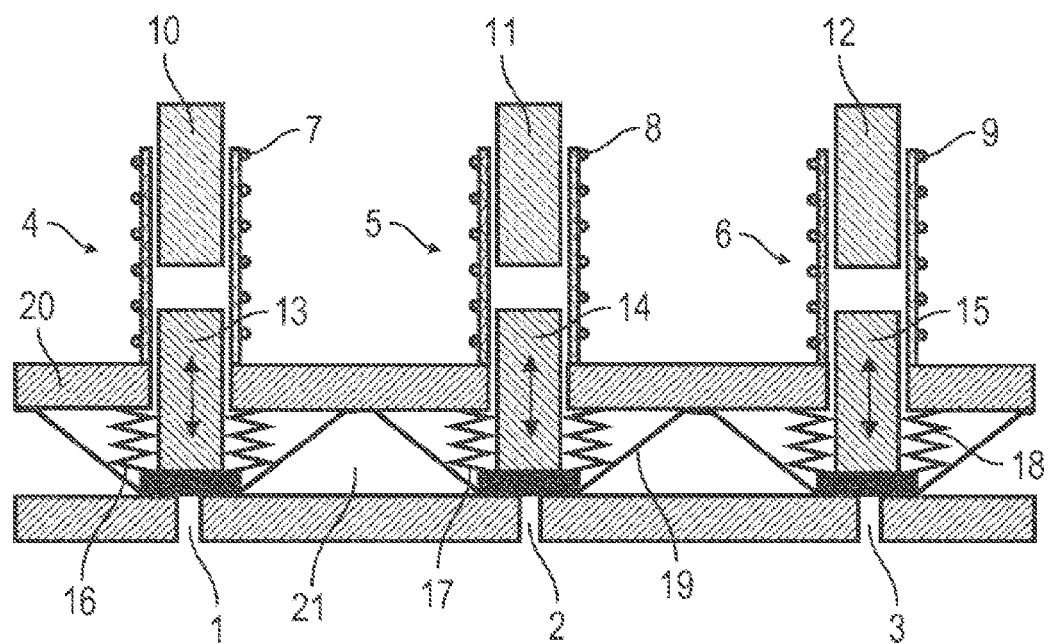

rates the valve actuator from the coating agent supply, the actuator side of the membrane facing the valve actuator and the coating agent side of the membrane being exposed to the coating agent in the coating agent supply.

22 Claims, 6 Drawing Sheets

(51) Int. Cl.
  B05B 1/30 (2006.01)
  B05B 13/04 (2006.01)
  F16K 1/00 (2006.01)
(52) U.S. Cl.
  CPC ........ B05C 5/0275 (2013.01); B05C 11/1028 (2013.01); B05B 1/3053 (2013.01); B05B 13/0452 (2013.01); F16K 1/00 (2013.01)
(58) Field of Classification Search
  CPC ..... F16K 1/00; B05B 1/3053; B05B 13/0452; B05B 1/306; B05B 1/3046; B05B 1/14
  USPC .................................................. 118/300, 313
  See application file for complete search history.

(56) References Cited

U.S. PATENT DOCUMENTS

| | | |
|---|---|---|
| 3,981,320 A | 9/1976 | Wiggins |
| 4,141,231 A | 2/1979 | Kudlich |
| 4,375,865 A | 3/1983 | Springer |
| 4,383,264 A | 5/1983 | Lewis |
| 4,423,999 A | 1/1984 | Choly |
| 4,430,010 A | 2/1984 | Zrenner et al. |
| 4,435,719 A | 3/1984 | Snaper |
| 4,478,241 A | 10/1984 | Cardenas-Franco |
| 4,555,719 A | 11/1985 | Arway et al. |
| 4,668,948 A | 5/1987 | Merkel |
| 4,734,711 A | 3/1988 | Piatt et al. |
| 4,826,135 A | 5/1989 | Mielke |
| 4,894,252 A | 1/1990 | Bongen |
| 4,941,778 A | 7/1990 | Lehmann |
| 4,974,780 A | 12/1990 | Nakamura et al. |
| 4,985,715 A | 1/1991 | Cyphert et al. |
| 5,050,533 A | 9/1991 | Zaber |
| 5,072,881 A | 12/1991 | Taube, III |
| 5,429,682 A | 7/1995 | Harlow, Jr. et al. |
| 5,435,884 A | 7/1995 | Simmons et al. |
| 5,538,221 A | 7/1996 | Joswig |
| 5,556,466 A | 9/1996 | Martin et al. |
| 5,602,575 A | 2/1997 | Pauly |
| 5,636,795 A | 6/1997 | Sedgwick et al. |
| 5,647,542 A | 7/1997 | Diana |
| 5,659,347 A | 8/1997 | Taylor |
| 5,681,619 A | 10/1997 | Ogasawara |
| 5,740,967 A | 4/1998 | Simmons et al. |
| 5,843,515 A | 12/1998 | Crum |
| 5,951,882 A | 9/1999 | Simmons et al. |
| 5,964,407 A | 10/1999 | Sandkleiva |
| 5,976,343 A | 11/1999 | Schlaak |
| 6,179,217 B1 | 1/2001 | Yoshida et al. |
| 6,540,835 B2 | 4/2003 | Kim et al. |
| 6,607,145 B1 | 8/2003 | Boriani et al. |
| 6,641,667 B2 | 11/2003 | Ochiai et al. |
| 6,712,285 B2 | 3/2004 | Provenaz et al. |
| 6,777,032 B2 | 8/2004 | Ogasahara et al. |
| 6,811,807 B1 | 11/2004 | Zimmermann et al. |
| 6,849,684 B2 | 2/2005 | Poppe et al. |
| 7,160,105 B2 | 1/2007 | Edwards |
| 7,178,742 B2 | 2/2007 | Nellentine et al. |
| 7,182,815 B2 | 2/2007 | Katagami et al. |
| 7,244,310 B2 | 7/2007 | Edwards |
| 7,270,712 B2 | 9/2007 | Edwards |
| 7,357,959 B2 | 4/2008 | Bauer |
| 7,387,071 B2 | 6/2008 | Heinke et al. |
| 7,449,070 B2 | 11/2008 | Fellingham |
| 7,604,333 B2 | 10/2009 | Horsnell |
| 7,757,632 B2 | 7/2010 | Edwards |
| 7,837,071 B2 | 11/2010 | Achrainer |
| 7,901,741 B2 | 3/2011 | Katagami et al. |
| 8,028,651 B2 | 10/2011 | Rademacher et al. |
| 8,118,385 B2 | 2/2012 | Van De Wynckel et al. |
| 8,449,087 B2 | 5/2013 | Kataoka et al. |
| 8,545,943 B2 | 10/2013 | Frankenberger et al. |
| 8,652,581 B2 | 2/2014 | Merchant |
| 8,678,535 B2 | 3/2014 | Beier et al. |
| 8,875,655 B2 | 11/2014 | Pettersson et al. |
| 8,882,242 B2 | 11/2014 | Beier et al. |
| 9,108,424 B2 | 8/2015 | Wallsten et al. |
| 9,140,247 B2 | 9/2015 | Herre et al. |
| 9,156,054 B2 | 10/2015 | Ikushima |
| 9,266,353 B2 | 2/2016 | Beier et al. |
| 9,393,787 B2 | 7/2016 | Ikushima |
| 9,464,573 B2 | 10/2016 | Remy et al. |
| 9,592,524 B2 | 3/2017 | Fritz et al. |
| 9,701,143 B2 | 7/2017 | Ikushima |
| 9,707,585 B2 | 7/2017 | Reimert et al. |
| 9,844,792 B2 | 12/2017 | Pettersson et al. |
| 9,901,945 B2 | 2/2018 | Fehr et al. |
| 9,914,150 B2 | 3/2018 | Pettersson et al. |
| 10,016,977 B2 | 7/2018 | Stefani et al. |
| 10,105,946 B2 | 10/2018 | Nakamura et al. |
| 10,150,304 B2 | 12/2018 | Herre et al. |
| 10,252,552 B2 | 4/2019 | Pitz et al. |
| 10,272,677 B2 | 4/2019 | Stefani et al. |
| 10,532,569 B2 | 1/2020 | Wallsten et al. |
| 2001/0017085 A1 | 8/2001 | Kubo et al. |
| 2001/0019340 A1 | 9/2001 | Kubo et al. |
| 2002/0024544 A1 | 2/2002 | Codos |
| 2002/0043280 A1 | 4/2002 | Ochiai et al. |
| 2002/0043567 A1 | 4/2002 | Provenaz et al. |
| 2002/0105688 A1 | 8/2002 | Katagami et al. |
| 2002/0128371 A1 | 9/2002 | Poppe et al. |
| 2003/0020783 A1* | 1/2003 | Sanada ................ B41J 2/14 347/40 |
| 2003/0041884 A1 | 3/2003 | Bahr |
| 2003/0049383 A1 | 3/2003 | Ogasahara et al. |
| 2004/0028830 A1 | 2/2004 | Bauer |
| 2004/0089234 A1 | 5/2004 | Hagglund et al. |
| 2004/0123159 A1 | 6/2004 | Kerstens |
| 2004/0173144 A1 | 9/2004 | Edwards |
| 2004/0221804 A1 | 11/2004 | Zimmermann et al. |
| 2004/0231594 A1 | 11/2004 | Edwards |
| 2004/0238522 A1 | 12/2004 | Edwards |
| 2004/0256501 A1 | 12/2004 | Mellentine et al. |
| 2004/0261700 A1 | 12/2004 | Edwards |
| 2005/0000422 A1 | 1/2005 | Edwards |
| 2005/0015050 A1 | 1/2005 | Mowery et al. |
| 2005/0016451 A1 | 1/2005 | Edwards |
| 2005/0023367 A1 | 2/2005 | Reighard et al. |
| 2005/0243112 A1 | 11/2005 | Kobayashi et al. |
| 2006/0061613 A1 | 3/2006 | Fienup et al. |
| 2006/0068109 A1 | 3/2006 | Frankenberger et al. |
| 2006/0146379 A1 | 7/2006 | Katagami et al. |
| 2006/0238587 A1 | 10/2006 | Horsnell |
| 2006/0251796 A1 | 11/2006 | Fellingham |
| 2007/0062383 A1 | 3/2007 | Gazeau |
| 2007/0292626 A1 | 12/2007 | Larsson et al. |
| 2008/0271674 A1 | 11/2008 | Rademacher |
| 2008/0309698 A1 | 12/2008 | Nakano et al. |
| 2009/0027433 A1 | 1/2009 | Van De Wynckel et al. |
| 2009/0029069 A1 | 1/2009 | Edwards |
| 2009/0181182 A1 | 7/2009 | Sloan |
| 2010/0132612 A1 | 6/2010 | Achrainer |
| 2010/0156970 A1 | 6/2010 | Ikushima |
| 2010/0170918 A1 | 7/2010 | Achrainer |
| 2010/0279013 A1 | 11/2010 | Frankenberger et al. |
| 2010/0282283 A1 | 11/2010 | Bauer |
| 2010/0321448 A1 | 12/2010 | Buestgens et al. |
| 2011/0014371 A1 | 1/2011 | Herre et al. |
| 2011/0084150 A1 | 4/2011 | Merchant |
| 2011/0248046 A1 | 10/2011 | Simion |
| 2011/0262622 A1 | 10/2011 | Herre |
| 2012/0085842 A1 | 4/2012 | Ciardella |

(56) References Cited

U.S. PATENT DOCUMENTS

| | | |
|---|---|---|
| 2012/0105522 A1 | 5/2012 | Wallsten |
| 2012/0114849 A1* | 5/2012 | Melcher ............... F16K 31/122 427/201 |
| 2012/0162331 A1 | 6/2012 | Kataoka |
| 2012/0186518 A1 | 7/2012 | Herre |
| 2012/0219699 A1 | 8/2012 | Pettersson et al. |
| 2012/0249679 A1 | 10/2012 | Beier et al. |
| 2012/0282405 A1 | 11/2012 | Herre |
| 2013/0201243 A1 | 8/2013 | Yoshida |
| 2013/0215203 A1 | 8/2013 | Chen |
| 2013/0257984 A1 | 10/2013 | Beier et al. |
| 2013/0284833 A1 | 10/2013 | Fritz et al. |
| 2014/0076985 A1 | 3/2014 | Pettersson et al. |
| 2014/0242285 A1 | 8/2014 | Pettersson et al. |
| 2015/0009254 A1 | 1/2015 | Kaiba et al. |
| 2015/0042716 A1 | 2/2015 | Beier et al. |
| 2015/0086723 A1 | 3/2015 | Bustgens |
| 2015/0098028 A1 | 4/2015 | Ohnishi |
| 2015/0328654 A1 | 11/2015 | Schwab |
| 2015/0375258 A1 | 12/2015 | Fritz et al. |
| 2015/0375507 A1 | 12/2015 | Ikushima |
| 2016/0052312 A1 | 2/2016 | Pitz et al. |
| 2016/0074822 A1 | 3/2016 | Han |
| 2016/0288552 A1 | 10/2016 | Ikushima |
| 2016/0306364 A1 | 10/2016 | Ikushima et al. |
| 2017/0087837 A1 | 3/2017 | Stefani et al. |
| 2017/0106393 A1 | 4/2017 | Hampson et al. |
| 2017/0136481 A1 | 5/2017 | Fritz et al. |
| 2017/0252765 A1 | 9/2017 | Medard |
| 2017/0267002 A1 | 9/2017 | Pitz et al. |
| 2017/0299088 A1 | 10/2017 | Rau |
| 2017/0361346 A1 | 12/2017 | Lahidjanian et al. |
| 2018/0022105 A1 | 1/2018 | Nakamura et al. |
| 2018/0056670 A1 | 3/2018 | Kerr |
| 2018/0093491 A1 | 4/2018 | Murayama et al. |
| 2018/0178505 A1 | 6/2018 | Stefani et al. |
| 2018/0222186 A1 | 8/2018 | Stefani et al. |
| 2018/0250955 A1 | 9/2018 | Herre |
| 2019/0091712 A1 | 3/2019 | Medard et al. |

FOREIGN PATENT DOCUMENTS

| | | |
|---|---|---|
| CN | 1512919 A | 7/2004 |
| CN | 1176815 C | 11/2004 |
| CN | 1668386 A | 9/2005 |
| CN | 1761530 A | 4/2006 |
| CN | 101264698 A | 9/2008 |
| CN | 101309755 A | 11/2008 |
| CN | 101657264 A | 2/2010 |
| CN | 102177002 A | 9/2011 |
| CN | 102198434 A | 9/2011 |
| CN | 102971080 A | 3/2013 |
| CN | 103153483 A | 6/2013 |
| CN | 103909743 A | 7/2014 |
| CN | 104613205 A | 5/2015 |
| CN | 104994966 A | 10/2015 |
| CN | 105358259 A | 2/2016 |
| DE | 1284250 A | 11/1968 |
| DE | 1710895 U1 | 9/1977 |
| DE | 3045401 A1 | 7/1982 |
| DE | 3221327 A1 | 9/1983 |
| DE | 3225554 A1 | 1/1984 |
| DE | 3634747 A1 | 8/1987 |
| DE | 3804092 A1 | 9/1988 |
| DE | 4115111 A1 | 11/1991 |
| DE | 4138491 A1 | 5/1993 |
| DE | 9405600 U1 | 6/1994 |
| DE | 68924202 T2 | 2/1996 |
| DE | 19606716 C1 | 8/1997 |
| DE | 19630290 A1 | 1/1998 |
| DE | 19731829 A1 | 1/1999 |
| DE | 19743804 A1 | 4/1999 |
| DE | 9422327 U1 | 3/2000 |
| DE | 19852079 A1 | 5/2000 |
| DE | 19936790 A1 | 2/2001 |
| DE | 20017629 U1 | 3/2001 |
| DE | 10048749 A1 | 4/2002 |
| DE | 69429354 T2 | 5/2002 |
| DE | 69622407 T2 | 3/2003 |
| DE | 10307719 A1 | 9/2003 |
| DE | 60001898 T2 | 2/2004 |
| DE | 102004021223 A1 | 12/2004 |
| DE | 10331206 A1 | 1/2005 |
| DE | 102004034270 A1 | 2/2006 |
| DE | 102004044655 A1 | 3/2006 |
| DE | 102004049471 A1 | 4/2006 |
| DE | 60212523 T2 | 2/2007 |
| DE | 69836126 T2 | 8/2007 |
| DE | 60125369 T2 | 10/2007 |
| DE | 102006021623 A1 | 11/2007 |
| DE | 102006056051 A1 | 5/2008 |
| DE | 102007018877 A1 | 10/2008 |
| DE | 102007037663 A1 | 2/2009 |
| DE | 10 2008 018 881 A1 | 9/2009 |
| DE | 102008053178 A1 | 5/2010 |
| DE | 102009029946 A1 | 12/2010 |
| DE | 102009038462 A1 | 3/2011 |
| DE | 102010004496 A1 | 7/2011 |
| DE | 102010019612 A1 | 11/2011 |
| DE | 102012006371 A1 | 7/2012 |
| DE | 102012005087 A1 | 10/2012 |
| DE | 102012005650 A1 | 9/2013 |
| DE | 102012212469 A | 1/2014 |
| DE | 102012109123 A1 | 3/2014 |
| DE | 202013101134 U1 | 6/2014 |
| DE | 102013002412 A1 | 8/2014 |
| DE | 102013011107 A1 | 8/2014 |
| DE | 102013205171 A1 | 9/2014 |
| DE | 102014006991 A1 | 12/2014 |
| DE | 102014007523 A1 | 11/2015 |
| DE | 102014008183 A1 | 12/2015 |
| DE | 102014012705 A1 | 3/2016 |
| DE | 102014013158 A1 | 3/2016 |
| EP | 0138322 A1 | 4/1985 |
| EP | 0297309 A2 | 1/1989 |
| EP | 0665106 A2 | 8/1995 |
| EP | 1120258 A2 | 8/2001 |
| EP | 1764226 A1 | 3/2007 |
| EP | 1852733 A1 | 11/2007 |
| EP | 1884365 A1 | 2/2008 |
| EP | 1946846 A2 | 7/2008 |
| EP | 2002898 A1 | 12/2008 |
| EP | 2133154 A2 | 12/2009 |
| EP | 2151282 A1 | 2/2010 |
| EP | 2196267 A2 | 6/2010 |
| EP | 2380744 A2 | 10/2011 |
| EP | 2433716 A1 | 3/2012 |
| EP | 2468512 A1 | 6/2012 |
| EP | 2641661 A1 | 9/2013 |
| EP | 2644392 A2 | 10/2013 |
| EP | 2777938 A1 | 9/2014 |
| EP | 2799150 A1 | 11/2014 |
| EP | 2842753 A1 | 3/2015 |
| EP | 3002128 A2 | 4/2016 |
| EP | 3156138 A1 | 4/2017 |
| EP | 3213823 A1 | 9/2017 |
| EP | 3257590 A1 | 12/2017 |
| EP | 3272669 A1 | 1/2018 |
| EP | 3068626 B1 | 10/2019 |
| FR | 3010918 A1 | 3/2015 |
| GB | 2200433 A | 8/1988 |
| GB | 2367771 A | 4/2002 |
| GB | 2507069 A | 4/2014 |
| GN | 1438942 A | 8/2003 |
| GN | 101784348 A | 7/2010 |
| GN | 106414081 A | 2/2017 |
| JP | S5722070 A | 2/1982 |
| JP | S62116442 A | 5/1987 |
| JP | H04-106669 U | 9/1992 |
| JP | H0798171 B2 | 10/1995 |
| JP | H09192583 A | 7/1997 |
| JP | 2000158670 A | 6/2000 |
| JP | 2000317354 A | 11/2000 |

(56) References Cited

FOREIGN PATENT DOCUMENTS

| | | | |
|---|---|---|---|
| JP | 2001129456 | A | 5/2001 |
| JP | 2001157863 | A | 6/2001 |
| JP | 2001239652 | A | 9/2001 |
| JP | 2001300404 | A | 10/2001 |
| JP | 2002361863 | A | 12/2002 |
| JP | 2003506210 | A | 2/2003 |
| JP | 2003136030 | A | 5/2003 |
| JP | 2004142382 | A | 5/2004 |
| JP | 2005526234 | A | 9/2005 |
| JP | 2007021760 | A | 2/2007 |
| JP | 2007152666 | A | 6/2007 |
| JP | 2007520340 | A | 7/2007 |
| JP | 2007245633 | A | 9/2007 |
| JP | 2007289848 | A | 11/2007 |
| JP | 2010531213 | A | 9/2010 |
| JP | 2010531729 | A | 9/2010 |
| JP | 2010241003 | A | 10/2010 |
| JP | 2011206958 | A | 10/2011 |
| JP | 2012506305 | A | 3/2012 |
| JP | 2012135925 | A | 7/2012 |
| JP | 2012206116 | A | 10/2012 |
| JP | 2012228643 | A | 11/2012 |
| JP | 2012228660 | | 11/2012 |
| JP | 2013067179 | A | 4/2013 |
| JP | 2013530816 | A | 8/2013 |
| JP | 2013530816 | B2 | 8/2013 |
| JP | 2013188706 | A | 9/2013 |
| JP | 2014019140 | A | 2/2014 |
| JP | 2014050832 | A | 3/2014 |
| JP | 2014111307 | A | 6/2014 |
| JP | 2015-009222 | A | 1/2015 |
| JP | 2015096322 | A | 5/2015 |
| JP | 2015520011 | A | 7/2015 |
| JP | 2015193129 | A1 | 11/2015 |
| JP | 2016507372 | A | 3/2016 |
| JP | 2016526910 | A | 9/2016 |
| JP | 2016175077 | A | 10/2016 |
| JP | 2016175662 | A | 10/2016 |
| JP | 2018012065 | A | 1/2018 |
| JP | 2020513311 | A | 5/2020 |
| JP | 2020513314 | A | 5/2020 |
| WO | 8601775 | A1 | 3/1986 |
| WO | 9856585 | A1 | 12/1998 |
| WO | 02098576 | A1 | 12/2002 |
| WO | 03021519 | A1 | 3/2003 |
| WO | 2003062129 | A2 | 7/2003 |
| WO | 2004048112 | A1 | 6/2004 |
| WO | 2004085738 | A2 | 10/2004 |
| WO | 2005016556 | A1 | 2/2005 |
| WO | 2005075170 | A1 | 8/2005 |
| WO | 2006022217 | A1 | 3/2006 |
| WO | 2007121905 | A1 | 11/2007 |
| WO | 2009019036 | A1 | 2/2009 |
| WO | 2010046064 | A1 | 4/2010 |
| WO | 2010146473 | A1 | 12/2010 |
| WO | 2011044491 | A1 | 4/2011 |
| WO | 2011128439 | A1 | 10/2011 |
| WO | 2011138048 | A1 | 11/2011 |
| WO | 2013121565 | A1 | 8/2013 |
| WO | 2015071270 | A1 | 5/2015 |
| WO | 2015096322 | A1 | 7/2015 |
| WO | 2015186014 | A1 | 12/2015 |
| WO | 2016-087016 | A1 | 6/2016 |
| WO | 2016142510 | A1 | 9/2016 |
| WO | 2016145000 | A1 | 9/2016 |
| WO | 2017006245 | A1 | 1/2017 |
| WO | 2017006246 | A1 | 1/2017 |
| WO | 2018102846 | A1 | 6/2018 |

OTHER PUBLICATIONS

European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
China National Intellectual Property Administration Office Action and Search Report for CN Application No. 201780077018.3 dated Aug. 27, 2020 (11 pages; Search Report in English).
Ghasem, G. et al; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).
International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).
International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).
International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
Chinese Office Action and Search Report for CN201780077603.3 dated Oct. 12, 2020 (15 pages; English translation not available).
EPO Examination Report for Application No. 201702818.1 dated Dec. 18, 2020 (with English machine translation; 6 pages).
Non-Final Office Action for U.S. Appl. No. 16/468,691 dated Jan. 7, 2021 (79 pages).
EPO Official Notification of Opposition for Application No. 178218038 dated Feb. 10, 2021 (64 pages; with English machine translation).
Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
Chinese Office Action for Application No. CN20178007017.9 dated Aug. 31, 2020 (8 pages; with English translation).
Non Final Office Action for U.S. Appl. No. 16/468,700 dated Dec. 1, 2020 (73 pages).
Non Final Office Action for U.S. Appl. No. 16/468,696 dated Nov. 2, 2020 (58 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
JPO Submission for JP2019-531096; submitted Dec. 21, 2020 (32 pages; with English translation).
JPO Submission for JP2019-531957; submitted Dec. 21, 2020 (21 pages; with English translation).
Fianl Office Action dated May 13, 2021 for U.S. Appl. No. 16/468,691 (70 pages).

(56) References Cited

OTHER PUBLICATIONS

Final Office Action dated Mar. 19, 2021 for U.S. Appl. No. 16/468,696 (45 pages).
Non-Final Office Action dated Apr. 28, 2021 for U.S. Appl. No. 16/468,693 (109 pages).
Final Office Action dated Apr. 19, 2021 for U.S. Appl. No. 16/468,700 (62 pages).
Notice of Allowance mailed in U.S. Appl. No. 16/468,689 dated Jun. 2, 2021 (38 pages).
Final Office Action dated Jun. 11, 2021 for U.S. Appl. No. 16/468,701 (53 pages).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Chinese Office Action dated Jun. 2, 2021 for Application No. CN201780077017.9 (17 pages; with English machine translation).
Japanese Notification of Reasons for Rejection dated Jun. 1, 2021 for Application No. JP2019-531944 (14 pages; with English machine translation).
Japanese Notification of Reasons for Rejection dated Jun. 8, 2021 for Application No. JP2019-531957 (13 pages; with English machine translation).
Supplemental Notice of Allowability dated Jul. 8, 2021 for U.S. Appl. No. 16/468,696 (11 pages).
Liptak, Bela. (2006). Instrument Engineers' Handbook (4th Edition)—Process Control and Optimization, vol. 2-2.1.3.5 Process Time Constant, (pp. 99-102). Taylor & Francis. Retrieved from https://app.knovel.eom/hotlink/pdf/id:kt00CC7HL1/instrument-engineers/process-time-constant (Year: 2006).
Japenese Patent Office Notice of Reasons of Refusal for Application No. JP 2019-531967 dated Jun. 8, 2021 (8 pages; with English machine translation).
Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
JPO Office Action dated Jul. 3, 2021 for Application No. JP2019-532024 (12 pages; with English machine translation).
Non-Final Office Action dated Aug. 27, 2021 for U.S. Appl. No. 16/468,695 (149 pages).

\* cited by examiner

PRINT HEAD FOR THE APPLICATION OF A COATING AGENT ON A COMPONENT

CROSS-REFERENCE TO RELATED APPLICATIONS

This application is a national stage of, and claims priority to, Patent Cooperation Treaty Application No. PCT/EP2017/081101, filed on Dec. 1, 2017, which application claims priority to German Application No. DE 10 2016 014 946.9, filed on Dec. 14, 2016, which applications are hereby incorporated herein by reference in their entireties.

BACKGROUND

The disclosure concerns a printhead for the application of a coating agent to a component, in particular for the application of a paint to a vehicle body component.

For the serial painting of vehicle body components, rotary atomizers are usually used as application devices, but these have the disadvantage of limited application efficiency, i.e. only part of the applied paint deposits on the components to be coated, while the rest of the applied paint has to be disposed of as so-called overspray.

A newer development line, on the other hand, provides for so-called printheads as application devices, as known for example from DE 10 2013 002 412 A1, U.S. Pat. No. 9,108,424 B2 and DE 10 2010 019 612 A1. In contrast to the known rotary atomizers, such printheads do not emit a spray of the paint to be applied, but rather a narrowly confined paint jet, which is deposited almost completely on the component to be laquered, so that virtually no overspray occurs.

With the well-known printheads, the coating agent to be applied (e.g. paint) is ejected through a nozzle, whereby the nozzle can be closed or opened by a sliding valve needle. The mechanical drive of the valve needle can be done by a magnetic actuator, which moves the valve needle and thus either closes or releases the nozzle.

A disadvantage of these well-known printheads is the fact that the valve actuator, including the valve needle, is exposed to the coating agent to be applied. On the one hand, this can lead to coating deposits on the valve actuator, which in the worst case can lead to malfunctions. On the other hand, this is also problematic in case of a colour change if different types of coating agents are to be applied one after the other, as the conventional design makes the rinsing of the printhead more difficult.

The technical background of the disclosure can also be found in DE 10 2014 012 705 A1 and DE 10 2007 037 663 A1.

The disclosure is therefore based on the task of creating a correspondingly improved printhead.

BRIEF DSESCRIPTION OF THE DRAWINGS

Figure 2:
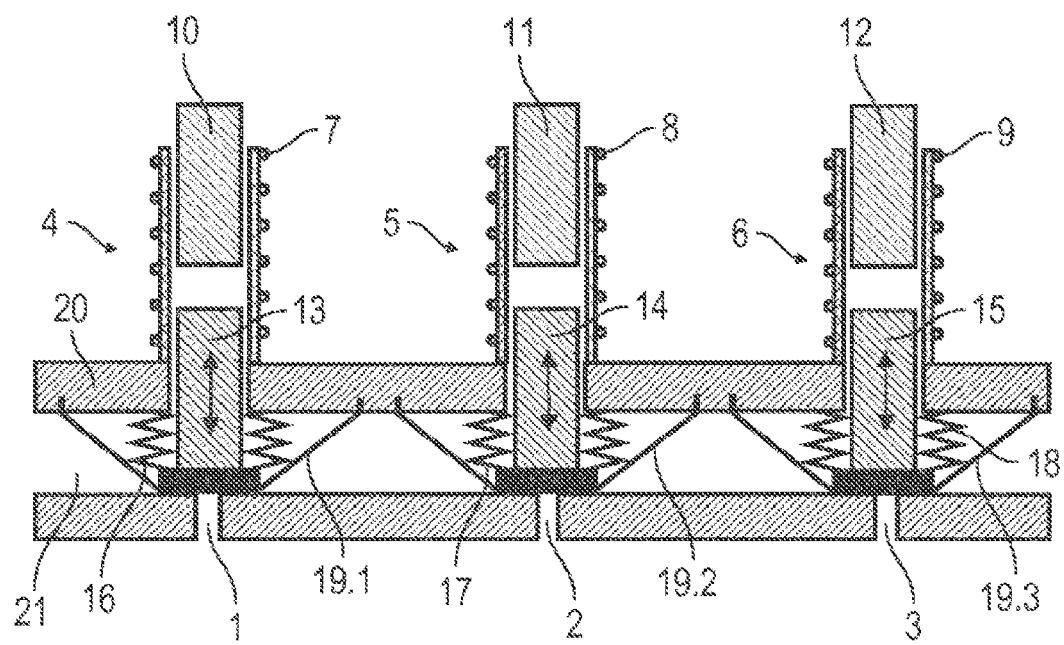
Figure 3:
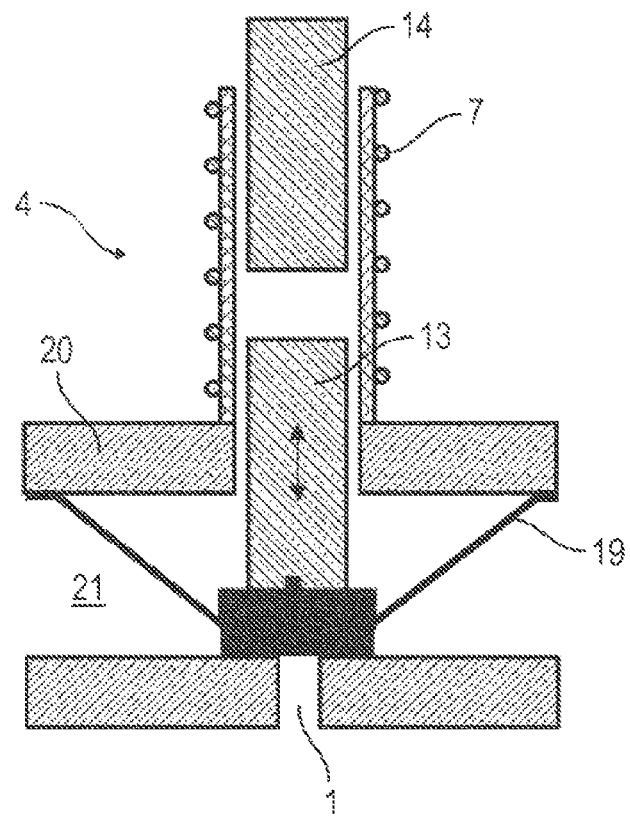
Figure 4:
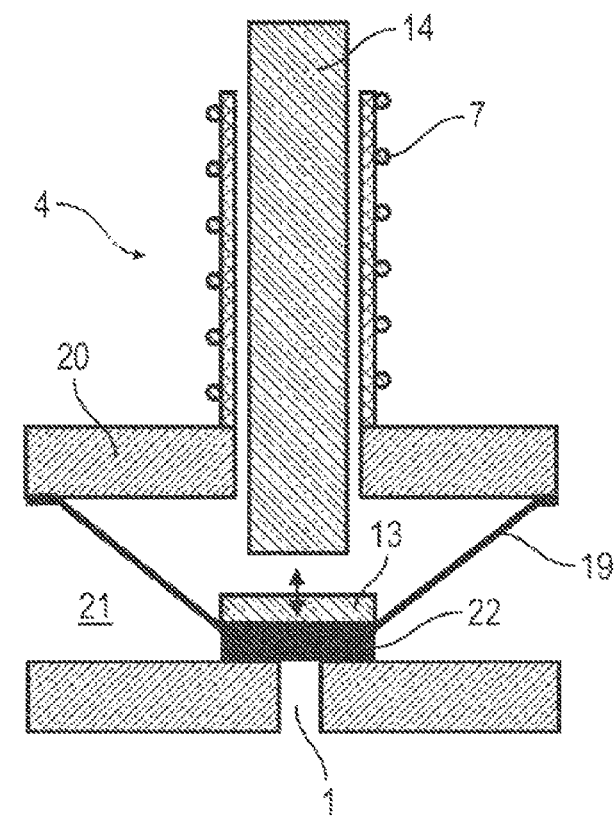
Figure 5:
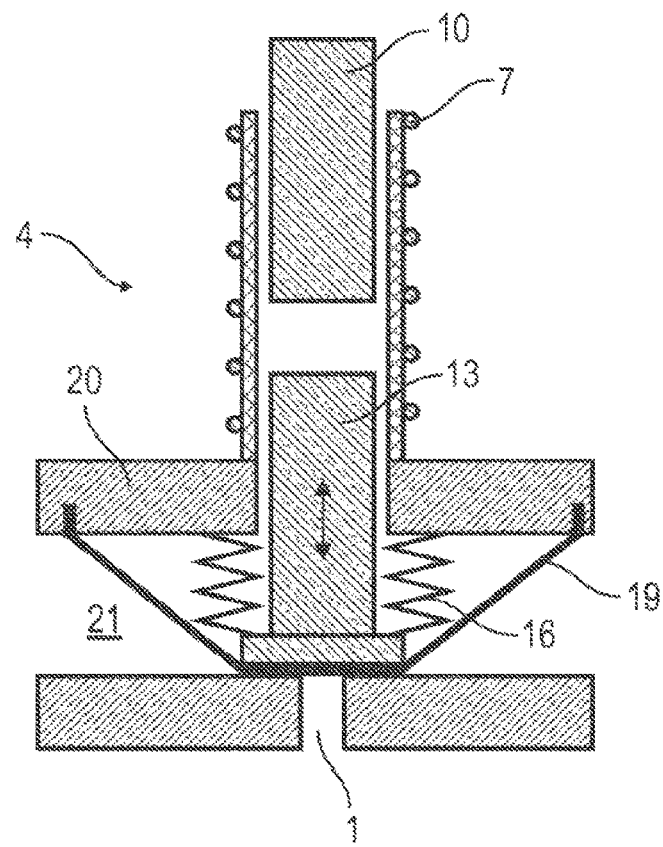
Figure 6:
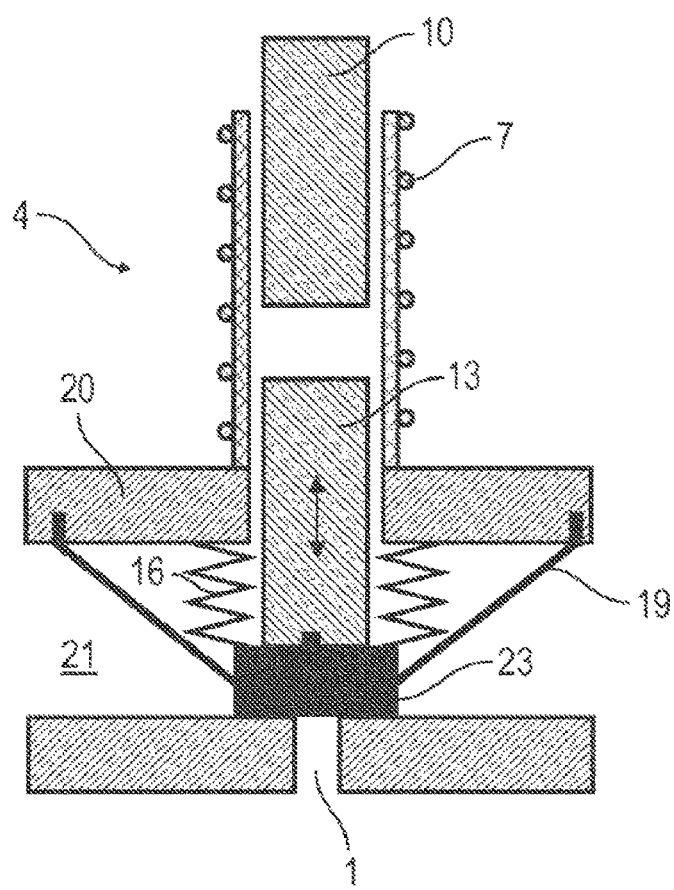
Figure 7:
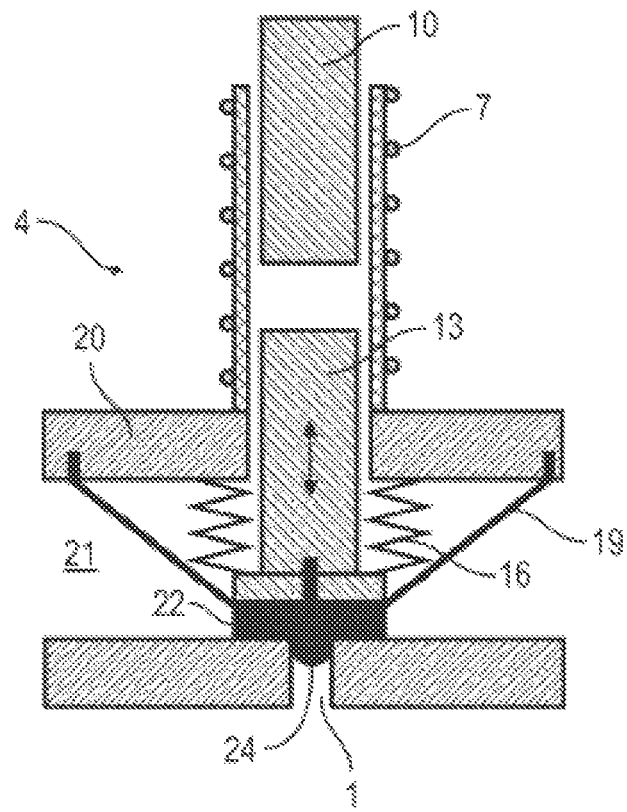
Figure 8:
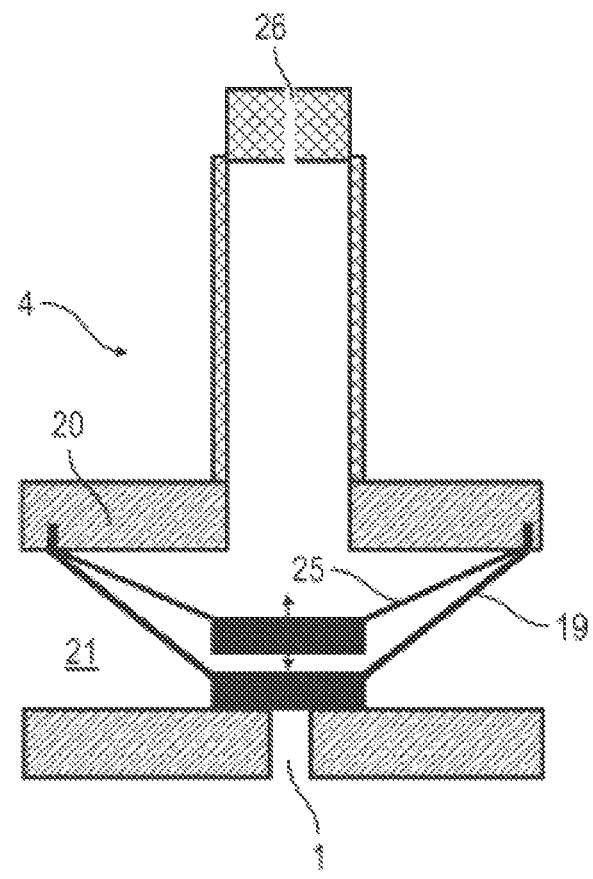

FIG. 1 shows a schematic representation of a printhead with several nozzles, each with a valve actuator and a continuous common membrane, FIG. 2 is a modification of FIG. 1, wherein a separate membrane is associated with each valve actuator, FIG. 3 shows a schematic representation of a printhead in accordance with the disclosure, whereby the membrane also fulfils the function of a return spring, FIG. 4 is a modification of FIG. 3, where the armature does not form a valve needle and the membrane contains magnetic particles, FIG. 5 shows a modification in which the valve actuator is arranged completely on the actuator side of the membrane, FIG. 6 shows a modification in which a part of the valve actuator is also arranged on the coating agent side, FIG. 7 a modification with an additional nipple to seal the outlet opening, FIG. 8 a modification with a hydraulic actuator.

Figure 9:
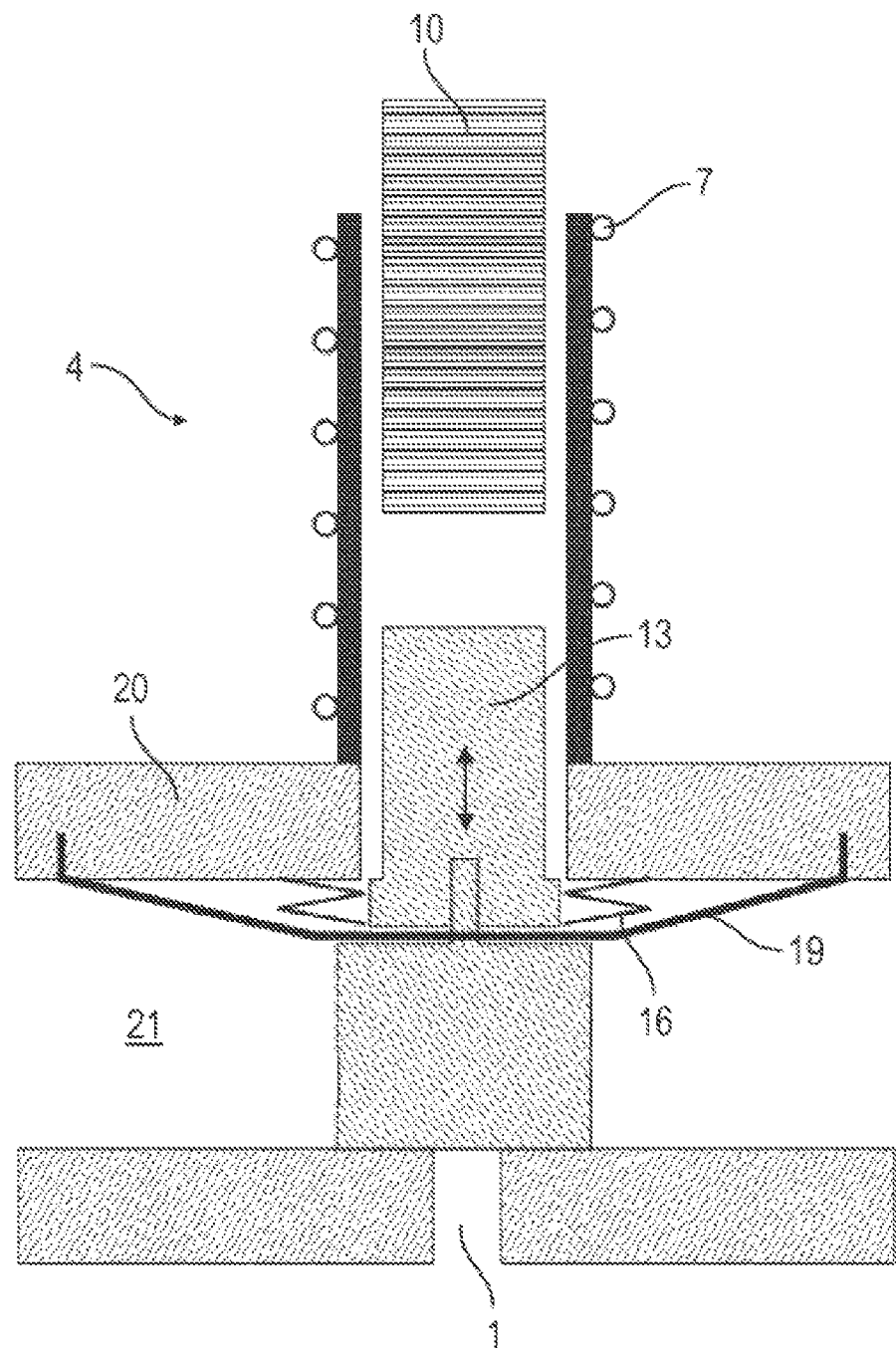

FIG. 9 another modification.

DETAILED DESCRIPTION

The printhead according to the disclosure is used to apply a coating agent (e.g. paint, adhesive, primer, sealant, etc.) to a component. Preferably, the printhead is designed in such a way that it can apply a coating agent to a vehicle body component. The term "printhead" used in the context of the disclosure is to be generally understood and serves essentially only to distinguish it from conventional atomizers which do not emit a spatially sharply defined jet of coating agent, but rather a spray of the coating agent. Such printheads are already known from the state of the art and therefore do not have to be described further. However, reference is only made to the above-mentioned publications U.S. Pat. No. 9,108,424 B2, DE 10 2010 019 612 A1 and DE 10 2013 002 412 A1, which in principle describe such printheads.

The printhead according to the disclosure has at least one outlet opening for dispensing the coating agent. In one example, this outlet opening is the nozzle opening of the printhead through which a coating agent jet of the coating agent is dispensed. However, it is also possible that the outlet opening may be another outlet opening upstream of the actual nozzle opening.

In addition, in accordance with the state of the art, the printhead according to the disclosure has a coating agent supply to supply the coating agent to be applied to the outlet opening.

Further, in accordance with the state of the art, the printhead according to the disclosure incorporates a movable valve element (e.g., a valve needle) movable between an open position and a closed position, the valve element closing the outlet opening in the closed position, while the movable valve element opens the outlet opening in the open position.

Furthermore, in accordance with the state of the art, the printhead according to the disclosure includes a valve actuator for moving the valve element between the open position and the closed position. With regard to the constructive design of the valve actuator, the disclosure offers various possibilities which are described in detail below. For example, the valve actuator can be a magnetic actuator, a fluid actuator (pneumatic or hydraulic) or a piezo actuator, to name just a few examples.

In contrast to the conventional printheads described at the beginning, the printhead according to the disclosure now features a flexible membrane that separates the valve actuator from the coating agent supply, with the membrane facing the valve actuator on its actuator side and exposed to the coating agent in the coating agent supply on its coating agent side.

The coating agent to be applied thus only touches the coating agent side of the flexible membrane in the coating agent supply, not the valve actuator, which is thus protected from the effect of the coating agent. With the printhead according to the disclosure, the valve actuator is separated from the media-carrying area, which is advantageous.

This separation prevents deposits in the drive area (e.g. on valve needles, pistons, in the inner tube of a coil, etc.). This maintains the function of the printhead and extends cleaning, flushing and maintenance intervals.

A further advantage is the considerably improved rinsing capability of the printhead, because the flexible membrane on its coating agent side offers hardly any starting points for coating agent deposits. This also has the advantage of a faster colour change, as the rinsing process is shorter.

In addition, two-component or multi-component coating paints can also be applied with the printhead according to the disclosure.

In addition, process reliability is increased and leakage safety improved.

Finally, lower actuating power is required to move the moving valve element.

In an example, the printhead has not only a single outlet opening with a single valve element, but several outlet openings, each with a movable valve element and a valve actuator.

In one variant of this example, each valve actuator is assigned a flexible membrane to separate the valve actuator.

In another variant of this example, a common, continuous, flexible membrane is provided, which separates the valve actuators from the coating agent supply. This continuous membrane can lie against the upper channel wall at individual points (e.g. between each valve actuator), be fastened or be continuously spaced from the upper channel wall.

It should also be noted that the printhead may have a return spring (e.g. coil spring) to push the flexible membrane into its rest position, whereby the rest position is preferably the closed position in which the movable valve element closes the outlet opening.

In addition to this return spring or instead of the return spring, the membrane can be elastically resilient, whereby the membrane then additionally fulfils the function of a return spring.

The movable valve element (e.g. valve needle) can therefore be pushed into the rest position by the return spring as well as by the elastic membrane.

Alternatively, it is possible to do without the usual return spring and then only the elastic membrane takes over the function of the return spring.

It should also be noted in this context that the rest position is preferably the closed position in which the movable valve element closes the outlet opening. Alternatively, it is also possible that the rest position is the open position in which the moving valve element releases the outlet opening. The flexible membrane can therefore press the moving valve element into either the closed or the open position due to its spring force, depending on the design of the printhead.

The disclosure also offers the possibility that the membrane itself may be magnetic or magnetizable or partially magnetic or magnetizable, or that it may be magnetic or magnetizable in the action area of the magnetic drive, for example by elements connected to the membrane and driven by a magnetic drive that either attracts or repels the magnetic membrane depending on its polarity. The magnetic effect of the membrane can, for example, be achieved by the membrane containing magnetic particles to make the membrane magnetic.

It has been briefly mentioned above that the printhead can have a sliding valve needle to move the movable valve element between the open position and the closed position. The valve needle can form a movable armature in a solenoid actuator.

In an example of the disclosure, this valve needle is firmly connected to the membrane and the valve element, so that the displacement of the valve needle inevitably leads to a corresponding deflection of the membrane and the valve element.

It should also be mentioned that the valve element and/or the valve needle may be located completely on the actuator side of the membrane and are separated from the coating agent supply by the membrane. Here the membrane can then be completely smooth on the coating agent side and therefore does not form any starting points for coating agent deposits.

Alternatively, it is also possible that the valve element and/or the valve needle are arranged with one part on the coating agent side and with another part on the actuator side with respect to the membrane, so that the membrane separates the two parts from each other. This variant of the disclosure may achieve a larger flow cross-section for the coating agent.

In addition, the valve element may have a nipple on the coating agent side of the membrane for closing or releasing the outlet opening, whereby this nipple then releases or closes the outlet opening.

In an example, this nipple is integrally molded to the membrane on the outlet side of the membrane.

It should also be mentioned in this context that the nipple may be shaped concentrically and congruently to the outlet opening in order to be able to close the outlet opening sealingly.

In a variant of the disclosure, the valve actuator is a fluid actuator that applies an adjustable fluid pressure to a flexible actuator membrane in order to deflect the actuator membrane and thus move the valve element between the open position and the closed position. For example, the fluid actuator can be a hydraulic drive or a pneumatic drive that applies a hydraulic fluid or compressed air to the actuator membrane.

The above-mentioned actuator membrane can be provided in addition to or form the flexible membrane mentioned at the beginning of this disclosure. The printhead according to the disclosure can therefore have two membranes for sealing and actuating or a single membrane for sealing and actuating.

With regard to the membrane, it should be noted that the membrane is preferably very thin and therefore preferably less than 0.5 mm, 0.1 mm, 0.05 mm or even less than 0.01 mm thick.

Concerning the printhead, it should be generally noted that the printhead preferably has a high application efficiency of at least 80%, 90%, 95% or even at least 99%, so that almost the entire applied coating agent is completely deposited on the component to be coated without overspray.

It is also advantageous for use in the series painting of vehicle body components if the printhead has a sufficient surface coating performance, preferably at least 0.5 m2/min, 1 $m^2$/min, 2 $m^2$/min or even 3 $m^2$/min.

With regard to the material for the membrane, there are various possibilities within the scope of the disclosure. For example, a metal foil can be used or a membrane made of a polymer material such as polytetrafluoroethylene (PTFE), nitrile rubber (NBR), fluoroelastomers (e.g. perfluoro rubber (FFKM) or fluoro rubber (FKM), polyurethane (PU), perfluoroalkoxy polymer (PFA), polyester (PE), polyamide, polyethylene (PE), polypropylene (PP), polyoxymethylene (POM). It is also possible that the membrane is a microporous membrane.

In a variant of the disclosure, the printhead emits a droplet jet as opposed to a jet of coating agent that is connected in the longitudinal direction of the jet. In another variant of the disclosure, the printhead emits a jet of coating agent being continuous in the longitudinal direction of the jet as opposed to a droplet jet.

FIG. 1 shows a schematic representation of a printhead according to the disclosure that can be used, for example, for paint application in the series painting of vehicle body components in a paint shop, where the printhead is guided by a multi-axis paint robot with a standard robot kinematics.

The printhead has several nozzles 1, 2, 3 in a nozzle plate in order to apply the paint to the component surface of the component to be painted, whereby a spatially narrowly limited paint jet (continuous or in the form of drops) is emitted from the nozzles 1-3 each. To simplify matters, only the three nozzles 1-3 are shown in the drawing. In practice, however, the printhead has a larger number of nozzles.

Each of the nozzles 1-3 is assigned a control valve 4, 5 or 6 to either open or close the nozzles 1-3.

The individual control valves 4-6 each have a coil 7, 8 or 9 in which a coil core is 10, 11 or 12.

In addition, the control valves 4-6 each have a movable armature 13, 14 or 15, which forms a valve needle, whereby the armatures 13-15 are displaced depending on the current supply to the associated coil 7-9.

The armatures 13-15 are pressed downwards in the drawing by a return spring 16, 17, 18 into the closed position in which the nozzles 1-3 are closed.

Finally, the printhead has a flexible, continuous membrane 19 attached between the control valves 4-6 each to an upper channel wall 20 of a coating agent supply 21. This continuous membrane 19 may be in contact with, fixed to or continuously spaced from the upper channel wall 20 at individual points (e.g. between each valve actuator) on the upper channel wall 20. On the other hand, between these fixing points, the membrane 19 can be deflected downwards. Here, the membrane 19 separates the coating agent supply 21 from the control valve 4-6. This is advantageous because this prevents coating agent deposits on the control valves 4-6.

For paint application, the control valves 4-6 are actuated with current so that the armature 13-15 is pulled upwards against the force of the return spring 16-18, whereby the armatures 13-15 release the nozzles 1-3. In this raised opening position, paint can then escape from the coating agent supply 21 through the nozzles 1-3.

Without energizing the coils 7-9, the return spring 16-18 pushes the armatures 13-15 downwards in the drawing, so that the armatures 13-15 block the nozzles 1-3 and thus switch off the paint discharge.

FIG. 2 shows a modification of FIG. 1, so that to avoid repetitions reference is made to the above description, using the same reference signs for corresponding details.

A feature of this example is that instead of the continuous membrane 19, three separate membranes 19.1, 19.2, 19.3 are provided for the individual control valves 4-6.

FIG. 3 shows a schematic representation of a modification that is also broadly consistent with the above example, so that reference is made to the above description to avoid repetition, using the same reference signs for corresponding details.

A feature of this example is that the return spring 16 is omitted and the membrane 19 fulfils the function of the return spring 16 instead.

FIG. 4 shows a further variation which also largely corresponds to the example described above, so that reference is made to the above description to avoid repetitions.

A feature of this example is that the armature 13 does not form a valve needle.

In addition, the membrane 19 contains magnetic particles 22 to support the magnetic control.

Furthermore, the membrane 19 also fulfils the function of the return spring 16 in this example, which is thus omitted.

FIG. 5 shows a further modification, which in turn partly coincides with the examples described above, so that reference is made to the above description in order to avoid repetitions, whereby the same reference signs are used for the corresponding details.

A feature of this example is that the control valve 4 is arranged completely on the actuator side of the membrane 19. This means that the membrane 19 on the coating agent side is completely smooth and therefore does not offer any starting points for coating agent deposits. This facilitates the removal of paint residues during a rinsing process.

FIG. 6 shows a modification of FIG. 5 so that to avoid repetition, reference is made to the above description, using the same reference signs for appropriate details.

A feature of this example is that part 23 of the armature 13 is located on the coating agent side of the membrane 19, which may have design advantages.

FIG. 7 also shows a further modification, so that to avoid repetitions, reference is made again to the above description, using the same reference signs for corresponding individual details.

A feature of this example is that a nipple 24 is arranged on the coating agent side of the membrane 19, which closes the nozzle 1 in the closed position. The nipple 24 is therefore arranged concentrically and congruently to the nozzle 1.

Furthermore, FIG. 8 shows another example which again largely corresponds to the examples described above, so that reference is made to the above description to avoid repetitions, whereby the same reference signs are used for the corresponding details.

A feature of this example is a hydraulic valve actuator.

A further membrane 25 is provided for this purpose, which can be supplied with hydraulic fluid via a hydraulic supply line 26 in order to deflect the membrane 25 and thus also the membrane 19 downwards and thereby close the nozzle 1.

Finally, FIG. 9 shows another example which again largely corresponds to the examples described above, so that reference is made to the above description to avoid repetitions, using the same reference signs for the corresponding details.

This example has an extended plunger (anchor 13) on the media side. The membrane 19 is deflected only slightly. The advantage is a larger flow cross-section.

The disclosure is not limited to the preferred examples described above. Rather, a large number of variants and modifications are possible which also make use of the disclosure ideas and therefore fall within the scope of protection. The disclosure thus comprises various aspects of the disclosure which enjoy protection independently of each other.

The invention claimed is:

1. A printhead for applying a coating agent to a component, having
    a) a first plate defining a plurality of outlet openings for dispensing the coating agent,
    b) a coating agent supply for supplying the coating agent to the plurality of outlet openings, c) a second plate supporting a plurality of movable valve elements, each valve element of the plurality of movable valve elements movable between an open position and a closed position, each valve element of the plurality of movable valve elements closing a respective one of the plurality of outlet openings, whereas each valve element of the plurality of movable valve elements releases the respective one of the plurality of outlet openings in the open position, and d) a plurality of valve actuators for moving the plurality of movable valve elements between the open positions and the closed positions, e) further comprising a continuous flexible membrane which separates the plurality of valve actuators from the coating agent supply, wherein an actuator side of the continuous flexible membrane faces the valve actuators and a coating agent side of the continuous flexible membrane is exposed to the coating agent in the coating agent supply, and wherein the continuous flexible membrane is fixed to the second plate between each moveable valve element of the plurality of movable valve elements.

2. The printhead according to claim 1, wherein a return spring is disposed between the second plate and the continuous flexible membrane, the return spring pressing the continuous flexible membrane away from the second plate.

3. The printhead according to claim 1, wherein the continuous flexible membrane is elastic and presses the movable valve element away from the first plate.

4. The printhead according to claim 1, wherein the continuous flexible membrane is magnetic or magnetizable and each valve actuator of the plurality of valve actuators has a magnetic actuator which either attracts or repels the magnetic or magnetizable continuous flexible membrane.

5. The printhead according to claim 4, wherein the continuous flexible membrane contains magnetic or magnetizable particles to make the continuous flexible membrane magnetic.

6. The printhead according to claim 1, wherein each valve actuator of the plurality of valve actuators includes a displaceable valve needle for moving the valve element between the open position and the closed position.

7. The printhead according to claim 1, wherein each valve actuator of the plurality of valve actuators includes a magnetic actuator having an electromagnetic coil supported by the second plate.

8. The printhead according to claim 6, wherein each valve needle is fixedly connected to the continuous flexible membrane and to one of the valve elements of the plurality of valve elements so that displacement of the valve needles inevitably leads to a corresponding deflection of the continuous flexible membrane and the valve element.

9. The printhead according to claim 6, wherein the valve elements and the valve needles are located completely on the actuator side of the continuous flexible membrane and are separated from the coating agent supply by the continuous flexible membrane.

10. The printhead according to claim 6, wherein at least one of the valve elements or the valve needles are located with one part in the coating agent supply and with another part on the actuator side of the continuous flexible membrane, wherein the continuous flexible membrane separates the one part from the another part.

11. The printhead according to claim 1, wherein each of the valve elements has a nipple on the coating agent side of the continuous flexible membrane.

12. The printhead according to claim 11, wherein the valve is elements are integrally formed on the continuous flexible membrane on the coating agent side of the continuous flexible membrane.

13. The printhead according to claim 11, wherein
a) the nipple on the coating agent side of the continuous flexible membrane is formed concentrically to one of the outlet openings, and
b) the nipple on the coating agent side of the membrane is congruently shaped to the shape of one of the outlet openings.

14. The printhead according to claim 1, wherein the valve actuators are fluid actuators which apply adjustable fluid pressure to a flexible actuator membrane on the actuator side of the continuous flexible membrane in order to deflect the actuator membrane and thus move the valve elements between the open positions and the closed positions.

15. The printhead according to claim 14, wherein each of the fluid actuators is a hydraulic actuator or a pneumatic actuator.

16. The printhead according to claim 15, wherein the actuator membrane forms the continuous flexible membrane.

17. The printhead according to claim 1, wherein the continuous flexible membrane consists of a polymer material.

18. The printhead according to claim 1, wherein the continuous flexible membrane is a microporous membrane.

19. The printhead according to claim 1, wherein the plurality of valve actuators are supported by the second plate.

20. The printhead according to claim 1, wherein the plurality of movable valve elements are independently movable relative to the second plate.

21. The printhead head according to claim 1, wherein the continuous flexible membrane is a metal foil.

22. The printhead according to claim 15, wherein the actuator membrane is provided in addition to the continuous flexible membrane.

\* \* \* \* \*

UNITED STATES PATENT AND TRADEMARK OFFICE
CERTIFICATE OF CORRECTION

PATENT NO. : 11,167,308 B2
APPLICATION NO. : 16/468697
DATED : November 9, 2021
INVENTOR(S) : Hans-Georg Fritz et al.

Page 1 of 1

It is certified that error appears in the above-identified patent and that said Letters Patent is hereby corrected as shown below:

In the Claims

Column 8, in Line 14, replace "valve is elements" with -- valve elements --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*